United States Patent [19]

Plotke

[11] Patent Number: 5,329,368
[45] Date of Patent: Jul. 12, 1994

[54] IMAGE TRACKING SYSTEM AND TECHNIQUE

[75] Inventor: Elozor Plotke, Los Angeles, Calif.

[73] Assignee: Hughes Aircraft Company, Los Angeles, Calif.

[21] Appl. No.: 2,517

[22] Filed: Jan. 11, 1993

Related U.S. Application Data

[63] Continuation of Ser. No. 562,504, Aug. 2, 1990, abandoned.

[51] Int. Cl.⁵ .................... H04N 5/14; H04N 7/18; G06F 15/336
[52] U.S. Cl. .................... 348/701; 382/42; 382/43; 382/54
[58] Field of Search ............... 338/105, 166, 125, 126; 250/332, 203.2, 203.5; 382/42, 43, 54, 56

[56] References Cited

U.S. PATENT DOCUMENTS

| | | | |
|---|---|---|---|
| 4,133,004 | 1/1979 | Fitts | 358/125 |
| 4,739,401 | 4/1988 | Sacks et al. | 358/105 X |
| 4,959,725 | 9/1990 | Mandle | 358/105 X |
| 4,985,765 | 1/1991 | Fernando | 358/105 |

FOREIGN PATENT DOCUMENTS

| | | |
|---|---|---|
| 2104668A | 3/1983 | United Kingdom . |
| 2187059A | 8/1987 | United Kingdom . |
| 2222499A | 3/1990 | United Kingdom . |

OTHER PUBLICATIONS

Matsuzuru et al., "A New Technique to Improve Video Stability by Digital Processing", Nov. 1988 *SMPTE Journal*, pp. 908–910.

Oppenheim et al., "Properties of the Continuous-Time Fourier Transform", ©1983 *Signals and Systems*, p. 202 through 205.

Pearson et al., "A Simple Motion Detector for Television Signals", *Journal of the SMPTE*, vol. 82, Jan. 1973, pp. 17–21.

*Primary Examiner*—Stephen C. Buczinski
*Attorney, Agent, or Firm*—Michael W. Sales; Wanda K. Denson-Low

[57] ABSTRACT

An image motion tracking system (10) for use with an image detector (12, 14) having an array of elements in the x and y directions. First, frequency domain representations of an image are created to provide a reference frame of image data and an input frame of image data. A processor (30) is included for detecting a change in phase of the detector (12, 14) with respect to first and second samples of the reference frame relative to corresponding first and second samples of the input frame to discern a displacement of at least a portion of the input frame relative to at least a portion of the reference frame. Finally, the output signal is corrected to compensate for the displacement of the input frame relative to the reference frame.

20 Claims, 2 Drawing Sheets

IMAGE TRACKING SYSTEM AND TECHNIQUE

This is a continuation of application Ser. No. 07/562,504 filed Aug. 2, 1990, now abandoned.

BACKGROUND OF THE INVENTION

1. Field of the Invention

The present invention relates to imaging systems. More specifically, the present invention relates to techniques for detecting a change in an image from one frame to another and either compensating therefor or providing an output signal indicative thereof.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

There are many applications in which it is desirable to detect motion of or within an image from one frame to the next. For example, it is well known in the art that certain conventional electro-optical systems experience jitter due to platform vibration which causes a degradation in image quality. While many image compensation techniques exist in the art for correcting for such jitter, there are numerous disadvantages associated with each. Conventional image compensation techniques include accelerometer oriented and gimbal oriented techniques. The accelerometer oriented techniques use an accelerometer to detect motion of the platform. The accelerometer generates control signals which are used to correct for vibration in the platform. The correction may be performed electronically or by adjustments in the optical train. Accelerometer oriented techniques are somewhat effective in controlling jitter. However, these systems are generally costly, unreliable, and have certain performance limitations, i.e., the ability to correct in multiple directions and in response time.

In gimbal oriented systems, the optical system is mounted on gimbals for stabilization. In addition to being costly, these mechanical systems are also generally cumbersome and heavy.

Another application for image motion detection is in security systems where there is a need to detect the movement or entry of something within an area of surveillance. Conventional techniques for image tracking involve the use of tracker algorithms such as the Fitts correlation tracker algorithm. Unfortunately, these algorithms are often computationally intensive and therefore somewhat slow. In addition, some algorithms, such as the Fitts algorithm, are limited with respect to the ability to perform subpixel tracking and to track multiple pixel movements.

Accordingly, there is a need in the art for a fast, inexpensive, and reliable image motion tracking system.

SUMMARY OF THE INVENTION

The need in the art is addressed by the present invention which provides an image motion tracking system for use with an image detector having an array of elements in the x and y directions. First, frequency domain representations of an image are created to provide a reference frame of image data and an input frame of image data. A processor is included for detecting a change in phase of the detector with respect to first and second samples of the reference frame relative to corresponding first and second samples of the input frame to discern a displacement of at least a portion of the input frame relative to a corresponding portion of the reference frame. Finally, in a first embodiment, an output signal is corrected to compensate for the displacement of the input frame relative to the reference frame.

In a specific embodiment, the processor operates on two frequency points in each frame to discern the displacement within the input frame relative to the reference frame.

In an alternative embodiment, the output signal is used to correct a displayed image for jitter by electronically adjusting the displayed image. In a second alternative embodiment, the output signal is used to correct a displayed image for jitter by mechanically adjusting an optical arrangement in front of the image detector. In a third alternative embodiment, the output signal is used to signal movement within a surveillance area.

DESCRIPTION OF THE INVENTION

Illustrative embodiments and exemplary applications will now be described with reference to the accompanying drawings to disclose the advantageous teachings of the present invention.

Figure 1:
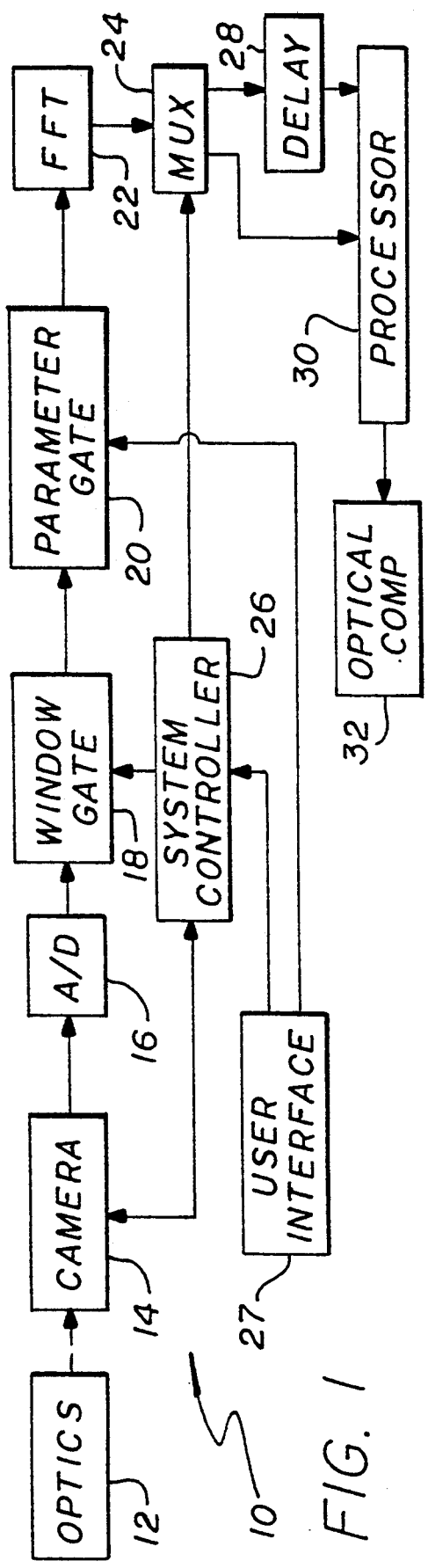
FIG. 1 is a block diagram of a first illustrative embodiment of the image tracking system of the present invention.

FIG. 1 is a block diagram of a first embodiment of the image tracking system 10 of the present invention. The system 10 includes an optics 12 for focusing an image on a camera 14. The optical arrangement 12 and the camera 14 may be of any conventional design appropriate for the application of interest. The camera 14 may be a scanning type image detector or a staring type detector without departing from the scope of the present teachings. In the preferred embodiment, the camera 14 has an array of M and N detector elements in the x and the y directions respectively. The camera 14 may provide an analog or a digital output. An analog-to-digital (A/D) converter 16 is provided to transform analog camera output to digitized samples representing a frame of image data.

A first reference frame of spatially oriented image data is gated and transformed to a corresponding frequency domain representation of same by a window gate 18, a parameter gate 20 and an FFT device 22 such as a digital filter which provides fast fourier transform of input data. The window gate 18 is a conventional device which gates a portion of an input image for further processing as is common in the art. As discussed more fully below, the parameter gate 20 provides points in frequency space of interest for the FFT 22 which obviates the need for transforming of the entire image within the window selected by the gate 18. The first reference frame of gated transformed image data is multiplexed to a delay device 28 prior to processing to allow for gating and transformation of a second frame of image data which represents an input frame. The multiplexer 24 operates under control of a system controller 26. The system controller synchronizes the operation of the camera 14 with that of the multiplexer 24. The system controller 26 is adapted to receive user input via an interface 27. The user interface also allows for user control of the points in frequency space which will be transformed by the FFT 22.

Thus, spatial domain representations of at least two points in frequency space for each of first and second frames of digitized image data, representing a reference frame and an input frame, are provided to a processor 30. In accordance with the present teachings, the processor 30 detects a change in phase of the detector elements of the camera 14 with respect to first and second frequency space samples of the reference frame relative to corresponding first and second frequency space samples of the input frame to discern a displacement of at least a portion of the input frame relative to a corresponding portion of the reference frame.

The processor 30 outputs a signal which represents a displacement within the input frame relative to the reference frame to an optical compensation system 32. The optical compensation system 32 may be a conventional servo-control system which mechanically adjusts the optical train to correct for the displacement of the input frame relative to the reference frame. The operation of the system 10 is repeated on a frame-by-frame basis with the second frame being the reference frame relative to the third frame and so on. Those skilled in the art will recognize that the system 10 will be effective to compensate for jitter from such sources as a platform vibration, gunner anxiety, and others.

Figure 2:
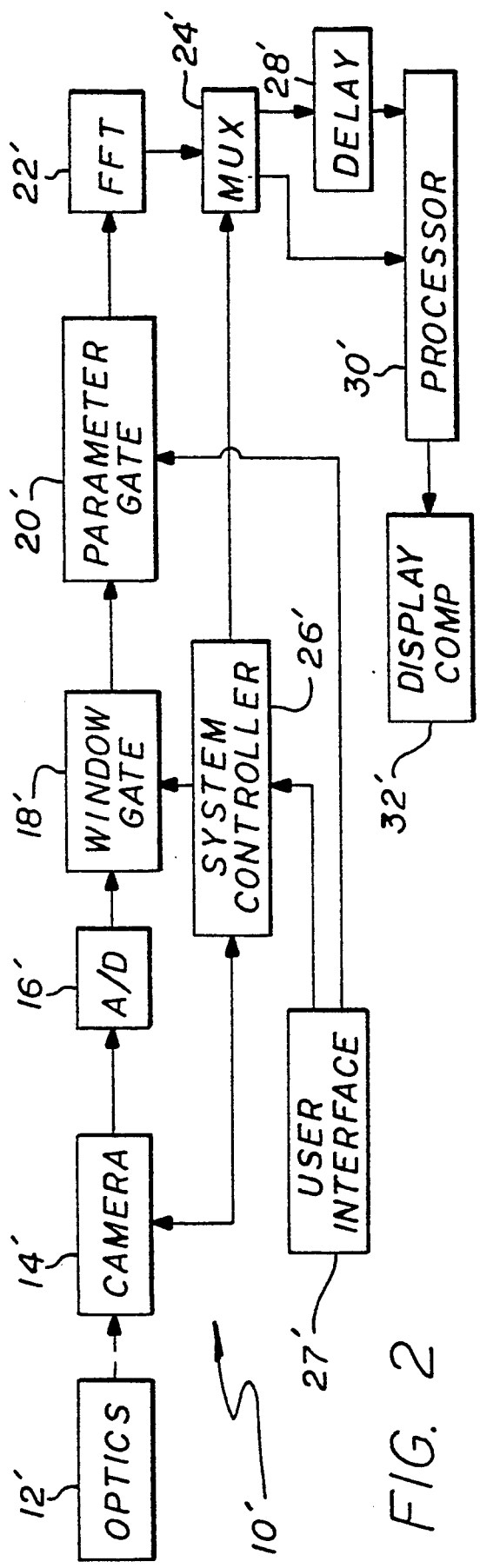
FIG. 2 is a block diagram of a second illustrative embodiment of the image tracking system of the present invention.

The first alternative embodiment 10' of FIG. 2 is essentially the same as that of FIG. 1 with the exception that the mechanical optical compensation system 32 is replaced by an electronic system 32'. The system 32' electronically corrects the output signal provided by the processor so that the input frame may be displayed without the displacement induced by the sources mentioned above. In actuality, the compensated signals may be provided by the processor 30'. The input scene can be re-registered to the reference scene by the amount of the calculated displacements.

Figure 3:
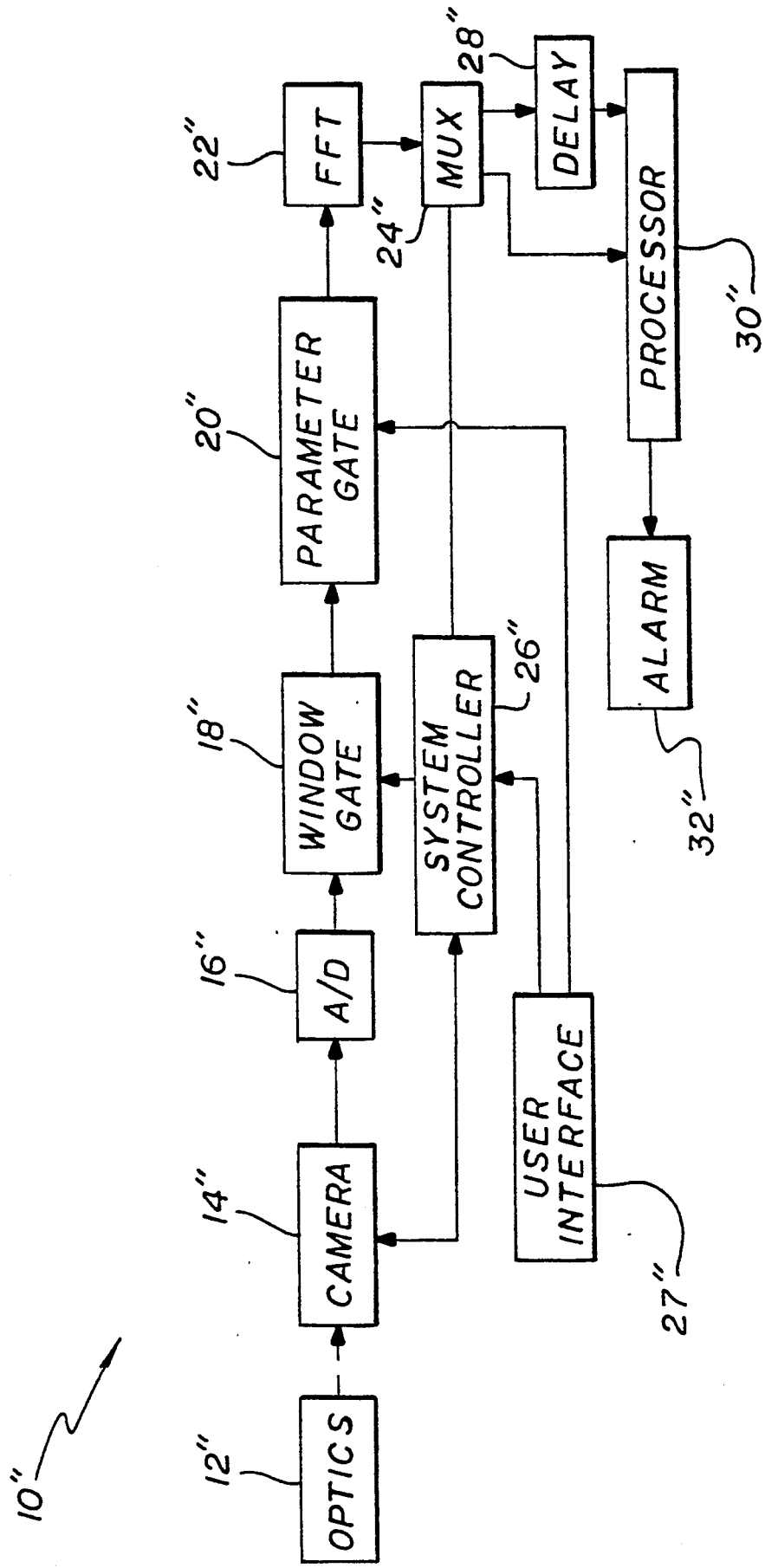
FIG. 3 is a block diagram of a third illustrative embodiment of the image tracking system of the present invention.

The second alternative embodiment 10'' of FIG. 3 is essentially the same as that of FIG. 1 with the exception that the compensation system 32 is replaced by an alarm 32'' which signals movement detected from one frame to another. Those skilled in the art will appreciate the utility of the system 10'' in surveillance and/or security applications.

With respect to the operation of the invention, it is noted that the frequency domain representations of the reference frame and the input frame are set forth by equations [1] and [2] below:

$$MAP(k/M\Delta x, l/N\Delta y) = \qquad [1]$$

$$\sum_{m=0}^{M-1} \sum_{n=0}^{N-1} MAP(m\Delta x, n\Delta y) \, e^{-j2\pi(mk/M + nl/N)}$$

$$IN(k/M\Delta x, l/N\Delta y) = \qquad [2]$$

$$\sum_{m=0}^{M-1} \sum_{n=0}^{N-1} IN(m\Delta x, n\Delta y) \, e^{-j2\pi(mk/M + nl/N)}$$

where $\Delta x$ and $\Delta y$ are the sample spacing in the x and y directions respectively, and M and N are even integers which represent the number of array elements in the x and y directions respectively. $MAP(m\Delta x, n\Delta y)$ and $IN(m\Delta x, n\Delta y)$ are the sample intensities of the reference and input frames respectively at the $(m\Delta x, n\Delta y)^{th}$ sample and k and l are integer values such that:

$$k = \pm 1, \pm 2, \pm 3, \ldots \text{ or } \pm((M/2)-1) \qquad [3]$$

and $$l = \pm 1, \pm 2, \pm 3, \ldots \text{ or } \pm((N/2)-1) \qquad [4]$$

The displacements in the x and y directions are respectively:

$$\Delta_x = ((C_1 l_2/N\Delta y) - (C_2 l_1/N\Delta y))/D \qquad [5]$$

$$\Delta_y = ((C_1 k_1/M\Delta x) - (C_2 k_2/M\Delta x))/D \qquad [6]$$

where $$D = (k_1/M\Delta x)(l_2/N\Delta y) - (k_2/M\Delta x)(l_1/N\Delta y) \qquad [7]$$

$$C_1 = -\sin^{-1}[I\{IN(k_1/M\Delta x, l_1/N\Delta y)/MAP(k_1/M\Delta x, l_1/N\Delta y)\}]/2\pi \qquad [8]$$

$$C_2 = -\sin^{-1}[I\{IN(k_2/M\Delta x, l_2/N\Delta y)/MAP(k_2/M\Delta x, l_2/N\Delta y)\}]/2\pi \qquad [9]$$

where $I\{IN(k/M\Delta x, l/N\Delta y)/MAP(k/M\Delta x, l/N\Delta y)\}$ represent the imaginary component of the bracketed parameters. One may choose l and k to be the smallest number in order to detect the largest possible displacement and $l_2$ should equal $-l_1$ or $k_2$ should equal $k_1$.

Thus, in accordance with the present teachings, the processor 30 provides the ratio of the value at the first frequency point in the input frame to that of the first frequency point in the reference frame as a first quotient. The imaginary component of the first quotient is computed and the inverse sine thereof is ascertained. The resulting value is divided by $2\pi$ and inverted in accordance with equations [8] and [9] above to determine the constants $C_1$ and $C_2$ respectively. Next, the processor takes the ratio between the difference between the product of the first value and the second coordinate of the second frequency point and the product of the second value and the second coordinate of the first frequency point and a determinate D to discern the displacement $\delta_x$ in a first direction of said input frame relative to the reference frame in accordance with equation [5]. Next, the processor takes the ratio between the difference between the product of the first value and the first coordinate of the first frequency point and the product of the second value and the first coordinate of the second frequency point and the determinate D to discern the displacement $\delta_y$ in the second direction in accordance with equation [6]. Accordingly, output signals are provided which represent displacement of an input image relative to a reference image as set forth above.

By operating in the imaginary plane, the processor 30 detects a change in phase of the detector elements of the camera 14 with respect to first and second frequency space samples of the reference frame relative to corresponding first and second frequency space samples of the input frame to discern a displacement of at least a portion of the input frame relative to a corresponding portion of the reference frame.

An explanation of the operation of the present invention is offered as follows. A useful property of Fourier transforms is the concept that a spatial shift in the spatial domain is a phase shift in the spatial frequency domain:

$$g(x-\delta_x, y-\delta_y) \leftrightarrow G(f_x, f_y) e^{-j2\pi(f_x\delta_x + f_y\delta_y)} \quad [10]$$

Assuming an input frame IN(x,y) is shifted by $\delta_x$ and $\delta_y$ from the reference frame MAP(x,y) then:

$$MAP(x,y) \leftrightarrow MAP(f_x, f_y) \quad [11]$$

and $$IN(x,y) = MAP(x - \delta_x, y - \delta_y) \leftrightarrow MAP(f_x, f_y) e^{-j2\pi(f_x\delta_x + f_y\delta_y)} \quad [12]$$
$$= IN(f_x, f_y)$$

The quotient, Q, of the input frame divided by the reference frame will result in the function for the shift in the frequency domain:

$$Q(f_x, f_y) = IN(f_x, f_y)/MAP(f_x, f_y) \quad [13]$$
$$= e^{-j2\pi(f_x\delta_x + f_y\delta_y)}$$

If it is known that:

$$Q(f_x, f_y) = e^{-j2\pi(f_x\delta_x + f_y\delta_y)} \quad [15]$$
$$= \cos[2\pi(f_x\delta_x + f_y\delta_y)] - j\sin[2\pi(f_x\delta_x + f_y\delta_y)]$$

It is necessary to use a single-valued function such as the sine function, to track the direction of the displacement and to restrict the argument of the sine function to $\leq |\pi/2|$ in order for the resulting answer to be unique. (The arcsin function is used in the preferred embodiment because the sign of the resultant is the same as the sign of the argument. Accordingly, it should be noted that the argument of the arcsin between $-1$ and $+1$ is a unique angle between $-\pi/2$ to $+\pi/2$. Therefore, shifts which correspond to greater than $|\pi/2|$ will not be tracked. Further, there is a limit on the maximum possible trackable displacement which is further limited by simultaneous movement in the x and y directions.) The maximum possible trackable displacement is given by:

$$M\Delta x N\Delta y/4(M\Delta xl + N\Delta yk) \quad [16]$$

Therefore, the imaginary part of the quotient I(Q) is used to solve for $\delta_x$ and $\delta_y$. Hence, $$I\{Q(f_x, f_y)\} = -\sin[2\pi(f_x\delta_x + f_y\delta_y)] \quad [17]$$

and solving for $(f_x\delta_x + f_y\delta_y)$:

$$f_x\delta_x + f_y\delta_y = -\sin^{-1}I\{Q(f_x, f_y)\}/2\pi \quad [18]$$

Equation [18] contains the desired spatial shift information in the x and y directions, $\delta_x$ and $\delta_y$ respectively. Cramer's rule is used to solve for $\delta_x$ and $\delta_y$. Cramer's rule for solving equations with two variables is used in order to find a unique solution for $\delta_x$ and $\delta_y$. In order to use Cramer's rule there must be two equations and two unknowns. The two unknowns are $\delta_x$ and $\delta_y$ and the two equations are found with two distinct frequency points $(f_{x1}, f_{y1})$ and $(f_{x2}, f_{y2})$. One can choose the lowest possible non-zero value for the frequencies to be able to find the greatest displacements. Also, one can choose $f_{x2}$ equal to $-f_{x1}$ or $f_{y2}$ equal to $-f_{y1}$ in order to have unique equations:

$$f_{x1}\delta_x + f_{y1}\delta_y = -\sin^{-1}I\{Q(f_{x1}, f_{y1})\}/2\pi \quad [19]$$

$$f_{x2}\delta_x + f_{y2}\delta_y = -\sin I\{Q(f_{x2}, f_{y2})\}/2\pi \quad [20]$$

$$D \begin{vmatrix} f_{x1} & f_{y1} \\ f_{x2} & f_{y2} \end{vmatrix} \neq 0 \quad [21]$$

then $$\delta_x = \frac{\begin{vmatrix} f_{x1}\delta_x + f_{y1}\delta_y & f_{y1} \\ f_{x2}\delta_x + f_{y2}\delta_y & f_{y2} \end{vmatrix}}{D} \quad [22]$$

$$\delta_y = \frac{\begin{vmatrix} f_{x1} & f_{x1}\delta_x + f_{y1}\delta_y \\ f_{x2} & f_{x2}\delta_x + f_{y2}\delta_y \end{vmatrix}}{D} \quad [23]$$

Instead of transforming an entire frame of image data which returns M×N spatial frequency components, computational time is reduced by only calculating the discrete Fourier transform for the spatial frequencies of interest. Hence, the following equation is used for the two-dimensional discrete Fourier transform:

$$G(k/M\Delta x, l/N\Delta y) = \sum_{m=0}^{M-1} \sum_{n=0}^{N-1} g(m\Delta x, n\Delta y) e^{-j2\pi(mk/M + nl/N)} \quad [24]$$

where $$f_x = k/M\Delta x \quad [25]$$

and $$f_y = 1/N\Delta y \quad [26]$$

where $\Delta x$ and $\Delta y$ are the sample spacing in the x and y directions, respectively, and $g(m\Delta x, n\Delta y)$ are the sample intensities at the $(m\Delta x, n\Delta y)^{th}$ sample.

Thus, the present invention has been described herein with reference to a particular embodiment for a particular application. Those having ordinary skill in the art and access to the present teachings will recognize additional modifications applications and embodiments within the scope thereof. For example, the invention is not limited to use with staring sensor arrays. Those of ordinary skill in the art may adapt the present teachings to scanning detector systems without undue experimentation and without departing from the scope of the present teachings. Further, the invention is not limited to the implementation shown. Those of ordinary skill in the art will be able to realize the advantageous operation of the present invention through other implementations without departing from the scope thereof.

It is therefore intended by the appended claims to cover any and all such applications, modifications and embodiments within the scope of the present invention.

Accordingly,

What is claimed is:

1. An image motion tracking system for use with an image detector having an array of elements in the x and y directions, comprising:
   first means for creating a first frequency domain representation of a reference frame of image data;

second means for creating a second frequency domain representation of an input frame of image data;

processing means for detecting changes in phase of said frequency domain representation of said reference frame relative to said frequency domain representation of said input frame to discern a displacement of at least a portion of said input frame relative to at least a portion of said reference frame, said processing means generating at least one output signal indicative of said displacement; and compensation means, responsive to said at least one output signal, for providing compensation for said displacement of said input frame relative to said reference frame.

2. The system of claim 1, further including display means for displaying said frames of image data, wherein said compensating means includes electronic means, responsive to said at least one output signal, for adjusting said displayed frames of image data for said displacement.

3. The system of claim 1, further including an optical arrangement, wherein said compensating means includes means, responsive to said at least one output signal, for adjusting said optical arrangement.

4. The system of claim 1, wherein said compensating means includes an alarm device, responsive to said at least one output signal, for signaling said displacement of at least a portion of said input frame relative to at least a portion of said reference frame.

5. The system of claim 1:

wherein said first means creates said first frequency domain representation for first and second pairs of selected frequencies;

wherein said second means creates said second frequency domain representation for said first and second pairs of selected frequencies; and wherein said processing means detects said phase changes from said frequency domain representations of said input and reference frames.

6. An image motion tracking system for use with an image detector having an array of elements in the x and y directions, comprising:

first means for creating a first frequency domain representation of a reference frame of image data for first and second pairs of selected frequencies;

second means for creating a second frequency domain representation of an input frame of image data for said first and second pairs of selected frequencies;

processing means for detecting changes in phase between said first and second frequency representations to discern a displacement of at least a portion of said input frame relative to at least a portion of said reference frame;

means for displaying said frames of image data; and electronic means for adjusting said displayed frames in response to said displacement.

7. An image motion tracking system for use with an image detector having an array of elements in the x and y directions, comprising:

first means for creating frequency domain representations of a reference frame of image data for first and second pairs of selected frequencies;

second means for creating frequency domain representations of an input frame of image data for said first and second pairs of selected frequencies;

processing means for detecting changes in phase between said first and second frequency representations to discern a displacement of at least a portion of said input frame relative to at least a portion of said reference frame;

an optical arrangement; and means for adjusting said optical arrangement in response to said displacement.

8. An image motion tracking system for use with an image detector having an array of elements in the x and y directions, comprising:

first means for creating a first frequency domain representation of a reference frame of image data for first and second pairs of selected frequencies;

second means for creating a second frequency domain representation of an input frame of image data for said first and second pairs of selected frequencies;

processing means for detecting changes in phase between said first and second frequency representations to discern a displacement of at least a portion of said input frame relative to at least a portion of said reference frame; and alarm means for outputting a signal indicative of said displacement of at least a portion of said input frame relative to at least a portion of said reference frame.

9. Apparatus for processing first and second time frames of image data, comprising:

transforming means for transforming said first and second time frames from time domains to first and second frequency domain representations for selected frequencies only; and first processing means, responsive to an output of said transforming means, for determining at least one phase shift between said first and second frequency domain representations.

10. The apparatus of claim 9, wherein said selected frequencies include high frequencies for detecting jitter between said first and second time frames.

11. The apparatus of claim 9, wherein said selected frequencies include low frequencies for detecting motion of an image between said first and second time frames.

12. The apparatus of claim 9, each one of said frames displaying an image in n dimensions, where $n \geq 1$, wherein said transforming means transforms each time frame for as many as n pairs of selected frequencies.

13. The apparatus of claim 9, said first and second time frames each displaying an image in an x-direction and in a y-direction, wherein said transforming means transforms said first time frame into said first frequency domain representation for selected first and second pairs of frequencies, and wherein said transforming means transforms said second time frame into said second frequency domain representation for said selected first and second pairs of frequencies.

14. The apparatus of claim 13, wherein only two frequencies among said first and second pairs are distinct.

15. The apparatus of claim 13, wherein said transforming means transforms a time frame (g) into a frequency domain representation (G) according to the following discrete fourier transform:

$$G(f_x,f_y) = \sum_{m=0}^{M-1} \sum_{n=0}^{N-1} g(m\Delta x, n\Delta y) e^{-j2\pi(mf_x\Delta x + nf_y\Delta y)}$$

where
- $f_x$ and $f_y$ are the selected frequencies in the x,y directions
- M and N are the number of pixels in the x,y directions, and
- $\Delta x$ and $\Delta y$ are the pixel spacings in the x,y directions.

16. The apparatus of claim 15, wherein said first and second pairs of selected frequencies are determined as follows:

$$f_x = k/M\Delta x \text{ where } k = \pm 1, \pm 2, \pm 3, \ldots \text{ or } \pm((M/2)-1); \text{ and}$$

$$f_y = l/M\Delta y \text{ where } l = \pm 1, \pm 2, \pm 3, \ldots \text{ or } \pm((N/2)-1).$$

17. The apparatus of claim 13, further comprising second processing means, responsive to an output of said first determining means, for determining a displacement of an image in said first and second time frames by considering only the imaginary component of said at least one phase shift.

18. The apparatus of claim 17, wherein said displacement in said x-direction ($\delta_x$) and said y-direction ($\delta_y$) are determined according to Cramer's rule as follows:

$$\delta_x = \frac{\begin{vmatrix} -[\sin^{-1}\Im\{Q(f_{x1},f_{y1})\}]/2\pi & f_{y1} \\ -[\sin^{-1}\Im\{Q(f_{x2m},f_{y2})\}]/2\pi & f_{y2} \end{vmatrix}}{D}$$

$$\delta_y = \frac{\begin{vmatrix} f_{x1} & -[\sin^{-1}\Im\{Q(f_{x1},f_{y1})\}]/2\pi \\ f_{x2} & -[\sin^{-1}\Im\{Q(f_{x2m},f_{y2})\}]/2\pi \end{vmatrix}}{D}$$

where determinant $D = \begin{vmatrix} f_{x1} & f_{y1} \\ f_{x2} & f_{y2} \end{vmatrix}$ and Q is a quotient of the input frame frequency domain representation to the reference frame frequency domain representation.

19. The apparatus of claim 9, further comprising second processing means, responsive to an output of said first determining means, for determining a displacement of an image in said first and second time frames by considering only the imaginary component of said at least one phase shift.

20. Apparatus for determining displacement in an x-direction ($\delta_x$) and a y-direction ($\delta_y$) of an image from a first time frame of image data to a second time frame of image data, comprising
means for storing said image data; and
means for processing said image data as follows:

$$\delta_x = \frac{\begin{vmatrix} -[\sin^{-1}\Im\{Q(f_{x1},f_{y1})\}]/2\pi & f_{y1} \\ -[\sin^{-1}\Im\{Q(f_{x2m},f_{y2})\}]/2\pi & f_{y2} \end{vmatrix}}{D}$$

$$\delta_y = \frac{\begin{vmatrix} f_{x1} & -[\sin^{-1}\Im\{Q(f_{x1},f_{y1})\}]/2\pi \\ f_{x2} & -[\sin^{-1}\Im\{Q(f_{x2m},f_{y2})\}]/2\pi \end{vmatrix}}{D}$$

where
$f_{x1}$, $f_{y1}$ are a first pair of selected frequencies,
$f_{x2}$, $f_{y2}$ are a second pair of selected frequencies, where determinant $D = \begin{vmatrix} f_{x1} & f_{y1} \\ f_{x2} & f_{y2} \end{vmatrix}$ and where $\Im Q$ is a quotient of the fourier transform of the input time frame to the fourier transform of the reference time frame.

* * * * *